United States Patent
Song et al.

(10) Patent No.: US 9,967,493 B2
(45) Date of Patent: May 8, 2018

(54) IMAGE SENSING DEVICE INSENSITIVE TO NOISE

(71) Applicant: SK hynix Inc., Gyeonggi-do (KR)

(72) Inventors: Jung-Eun Song, Gyeonggi-do (KR); Si-Wook Yoo, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days. days.

(21) Appl. No.: 15/154,840

(22) Filed: May 13, 2016

(65) Prior Publication Data

US 2017/0223284 A1    Aug. 3, 2017

(30) Foreign Application Priority Data

Jan. 29, 2016   (KR) .................. 10-2016-0011731

(51) Int. Cl.
*H04N 5/3745*   (2011.01)
*H04N 5/378*    (2011.01)

(52) U.S. Cl.
CPC ......... *H04N 5/37455* (2013.01); *H04N 5/378* (2013.01)

(58) Field of Classification Search
None
See application file for complete search history.

(56) References Cited

U.S. PATENT DOCUMENTS

| | | | |
|---|---|---|---|
| 2006/0001564 A1* | 1/2006 | Yamagata | H03M 1/0619 341/169 |
| 2008/0211951 A1* | 9/2008 | Wakabayashi | H04N 5/3658 348/308 |
| 2009/0033759 A1* | 2/2009 | Wakabayashi | H04N 5/335 348/222.1 |
| 2011/0001039 A1* | 1/2011 | Hoshino | H03M 1/144 250/208.1 |
| 2012/0161998 A1* | 6/2012 | Burm | H03K 4/06 341/155 |

FOREIGN PATENT DOCUMENTS

KR        1020090014103        2/2009

* cited by examiner

*Primary Examiner* — Justin P. Misleh
(74) *Attorney, Agent, or Firm* — IP & T Group LLP

(57) ABSTRACT

An image sensing device includes: a pixel suitable for generating a pixel signal based on a first driving voltage; a ramp signal generation block based on a variable resistance, the ramp signal generation block being suitable for generating a ramp signal whose slope is controlled by a resistance value varied according to an analog gain; a noise compensation block based on a fixed resistance suitable for sensing a noise component included in the first driving voltage to generate a noise signal and reflecting the noise signal in the ramp signal; and a digital processing block suitable for generating a digital signal based on the pixel signal and the ramp signal.

10 Claims, 5 Drawing Sheets

IMAGE SENSING DEVICE INSENSITIVE TO NOISE

CROSS-REFERENCE TO RELATED APPLICATIONS

The present application claims priority of Korean Patent Application No. 10-2016-0011731, filed on Jan. 29, 2016, which is incorporated herein by reference in its entirety.

BACKGROUND

1. Field

Exemplary embodiments of the present invention relate generally to a semiconductor design technology and, more particularly, to an image sensing device and a method for driving the same.

2. Description of the Related Art

Image sensing devices capture images using photosensitive properties of semiconductors. Image sensing devices are often classified into charge-coupled device (CCD) image sensors and complementary metal-oxide semiconductor (CMOS) image sensors. CMOS image sensors allow for both analog and digital control circuits to be directly realized on a single integrated circuit (IC), making CMOS image sensors the most widely used type of image sensor.

Image sensing devices include a ramp signal generation circuit for generating a ramp signal required when a voltage level of a pixel signal is determined. The ramp signal generation circuit is often classified into a ramp signal generation circuit based on a variable current and a ramp signal generation circuit based on a variable resistance. The ramp signal generation circuit based on the variable current controls a slope of the ramp signal by controlling a current amount when generating the ramp signal. The ramp signal generation circuit based on the variable resistance controls the slope of the ramp signal by controlling a resistance value when generating the ramp signal. The slope of the ramp signal is related to an analog gain. The ramp signal generation circuit based on the variable resistance is insensitive to a device noise as compared with the ramp signal generation circuit based on the variable current.

In addition, image sensing devices include a noise compensation circuit for offsetting a noise component reflected in a pixel signal. The noise component may be a pixel power noise included in a driving voltage used for generating the pixel signal. The noise compensation circuit senses the noise component based on the driving voltage and reflects the sensed noise component in the ramp signal. In this case, the noise component reflected in the pixel signal and the noise component reflected in the ramp signal through a latter-side circuit are offset by each other.

SUMMARY

Exemplary embodiments of the present invention are directed to an image sensing device that is insensitive to both of pixel power noise and device noise.

In accordance with an embodiment of the present invention, an image sensing device includes: a pixel suitable for generating a pixel signal based on a first driving voltage; a ramp signal generation block based on a variable resistance, the ramp signal generation block being suitable for generating a ramp signal whose slope is controlled by a resistance value varied according to an analog gain; a noise compensation block based on a fixed resistance suitable for sensing a noise component included in the first driving voltage to generate a noise signal and reflecting the noise signal in the ramp signal; and a digital processing block suitable for generating a digital signal based on the pixel signal and the ramp signal.

The image sensing device may further include: a sampling block suitable for sampling the pixel signal, the ramp signal and the noise signal.

The sampling block may include: a first sampling unit suitable for sampling the pixel signal; a second sampling unit suitable for sampling the ramp signal; and a third sampling unit suitable for sampling the noise signal.

Each of the first to third sampling units may include a capacitor.

A capacitance of the first sampling unit may be equal to the sum of a capacitance of the second sampling unit and a capacitance of the third sampling unit.

The ramp signal generation block may include: a ramp current generation unit coupled between a supply terminal of a second driving voltage and an output terminal of the ramp signal and suitable for generating a ramp current based on a clock signal and a bias signal having a uniform voltage level; and a variable resistance unit coupled between the output terminal of the ramp signal and a supply terminal of a ground voltage and having a resistance value varied based on a variable control signal corresponding to the analog gain.

The noise compensation block may include: a noise current generation unit coupled between a supply terminal of the first driving voltage and an output terminal of the noise signal and suitable for sensing the noise component from the first driving voltage and generating a noise current corresponding to the noise component; and a fixed resistance unit coupled between the output terminal of the noise signal and the supply terminal of the ground voltage and having a uniform resistance value.

In accordance with another embodiment of the present invention, an image sensing device includes: a pixel suitable for generating a pixel signal based on a first driving voltage; a ramp signal generation block suitable for generating a ramp signal whose slope is controlled based on an analog gain; a noise compensation block suitable for sensing a noise component included in the first driving voltage to generate a noise signal; a sampling block suitable for sampling the pixel signal, the ramp signal and the noise signal and reflecting a sampled noise signal in a sampled ramp signal; and a digital processing block suitable for generating a digital signal based on the sampled pixel signal and the sampled ramp signal.

The sampling block may include: a first sampling unit suitable for sampling the pixel signal; a second sampling unit suitable for sampling the ramp signal; and a third sampling unit suitable for sampling the noise signal.

Each of the first to third sampling units may include a capacitor.

A capacitance of the first sampling unit may be equal to the sum of a capacitance of the second sampling unit and a capacitance of the third sampling unit.

The ramp signal generation block may be designed based on a variable resistance.

The ramp signal generation block may include: a ramp current generation unit coupled between a supply terminal of a second driving voltage and an output terminal of the ramp signal and suitable for generating a ramp current based on a clock signal and a bias signal having a uniform voltage level; and a variable resistance unit coupled between the output terminal of the ramp signal and a supply terminal of a ground voltage and having a resistance value varied based on a variable control signal corresponding to the analog gain.

The noise compensation block may be designed based on a fixed resistance.

The noise compensation block may include: a noise current generation unit coupled between a supply terminal of the first driving voltage and an output terminal of the noise signal and suitable for sensing the noise component from the first driving voltage and generating a noise current corresponding to the noise component; and a fixed resistance unit coupled between the output terminal of the noise signal and the supply terminal of the ground voltage and having a uniform resistance value.

In accordance with another embodiment of the present invention, a method for driving an image sensing device includes: generating a ramp signal based on a resistance value varied according to an analog gain; generating a noise component included in a driving voltage of a pixel block as a noise current under the same condition regardless of the analog gain and reflecting a noise signal corresponding to the noise current in the ramp signal; generating a pixel signal from the pixel block; and generating a digital signal based on the pixel signal and the ramp signal.

The method may further include: sampling the pixel signal and the ramp signal, wherein the digital signal is generated based on the sampled pixel signal and the sampled ramp signal.

The method may further include: sampling the noise signal, wherein the sampled noise signal is reflected in the sampled ramp signal.

The noise component may be generated based on a uniform resistance value.

DETAILED DESCRIPTION

Exemplary embodiments of the present invention will be described below in more detail with reference to the accompanying drawings. These embodiments are provided so that this disclosure is thorough and complete. All "embodiments" referred to in this disclosure refer to embodiments of the invention disclosed herein. The embodiments presented are merely examples and are not intended to limit the invention.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises," "comprising," "includes" and/or "including" when used in this specification, indicate the presence of stated features, but do not preclude the presence or addition of one or more other features. As used herein, the term "and/or" indicates any and all combinations of one or more of the associated listed items.

In some instances, as would be apparent to one of ordinary skill in the art features described in connection with a particular embodiment may be used singly or in combination with other embodiments unless otherwise specifically indicated.

For the sake of convenience in description, a pixel array of a 4*4 structure is described in the embodiments of the present invention, however, we note that the invention is not limited to this.

Figure 1:
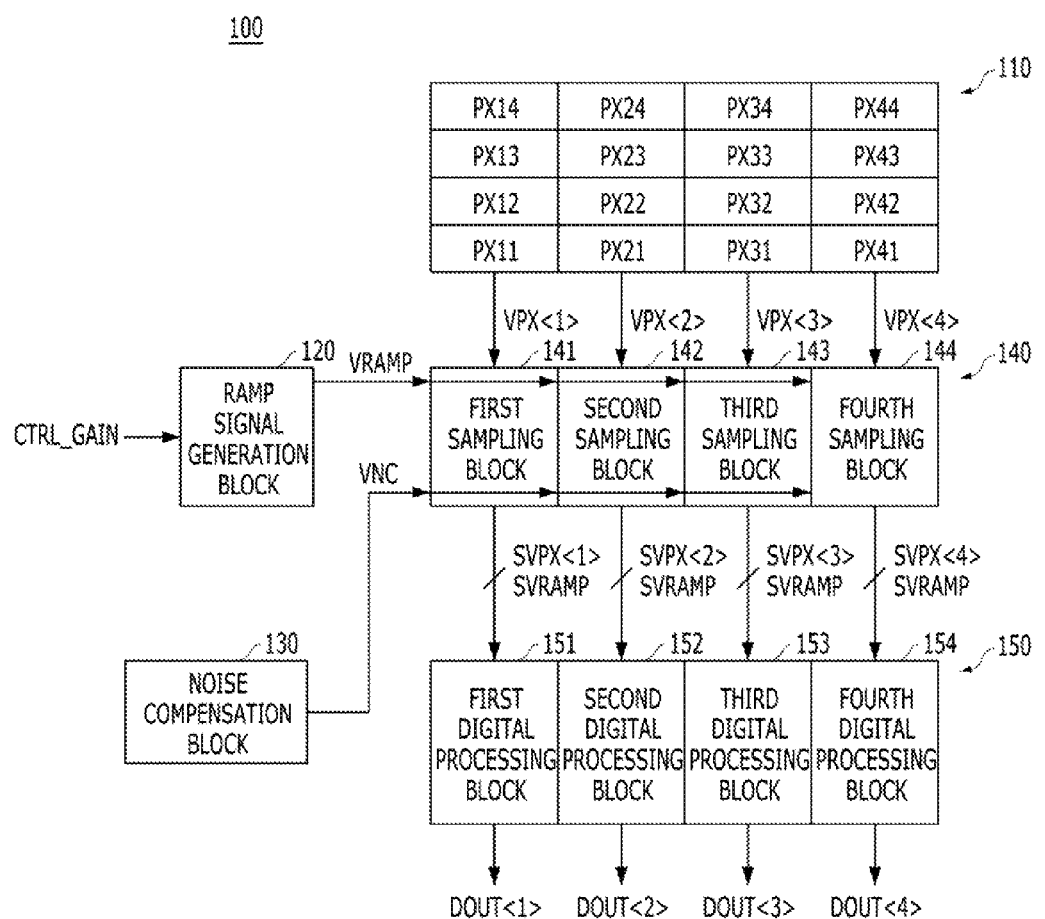
FIG. 1 is a block diagram illustrating an image sensing device, according to an embodiment of the present invention.

According to the embodiment of FIG. 1 an image sensing device is provided, according to an embodiment of the present invention.

According to the embodiment of FIG. 1, an image sensing device 100 may include a pixel array 110, a ramp signal generation block 120, a noise compensation block 130, first to fourth sampling blocks 140, and first to fourth digital processing blocks 150.

The pixel array 110 may include 4*4 pixels arranged rows and columns. The pixel array 110 may generate first to fourth pixel signals VPX<1:4> in a row unit. The pixel array 110 may generate first to $X^{th}$ pixel signals VPX<1:X> based on a first driving voltage VDDPX (Shown in FIG. 2) applied to the pixel array 110.

The ramp signal generation block 120 may generate a ramp signal VRAMP whose slope is controlled by a resistance value varied according to a variable control signal CTRL_GAIN corresponding to an analog gain. For example, the ramp signal generation block 120 may include a ramp signal generation circuit based on a variable resistance.

The noise compensation block 130 may generate a noise component included in the first driving voltage VDDPX as a noise signal VNC. Particularly, the noise compensation block 130 may generate the noise signal VNC corresponding to the noise component under the same condition regardless of the analog gain. For example, the noise compensation block 130 may include a noise signal compensation circuit based on a fixed resistance.

The first to fourth sampling blocks 140 may sample the first to $X^{th}$ pixel signals VPX<1:X>, the ramp signal VRAMP and the noise signal VNC. The first to fourth sampling blocks 140 may be designed in the same manner to each other. For example, each of the first to fourth sampling blocks 140 may include a plurality of capacitors as will be explained later in more detail.

The first to fourth digital processing blocks 150 may generate first to $X^{th}$ digital signals DOUT<1:X> based on the sampled first to $X^{th}$ pixel signals SVPX<1:X>, the sampled ramp signal SVRAMP and the sampled noise signal SVNC. The first to fourth digital processing blocks 150 may be designed in the same manner each other. For example, each of the first to fourth digital processing blocks 150 may include an analog-to-digital converter (ADC) as will be explained later in more detail.

Figure 2:
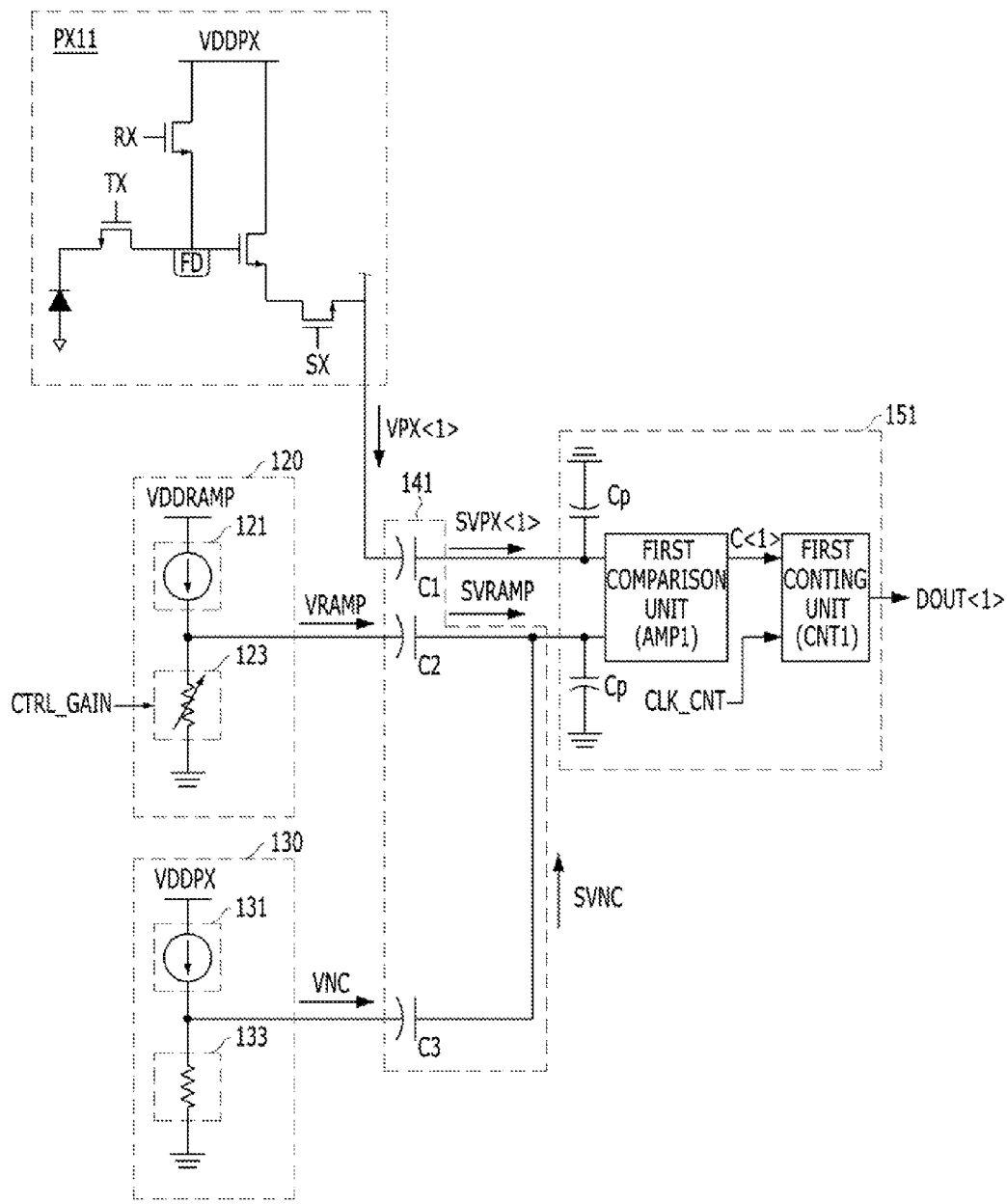
FIG. 2 is a circuit diagram illustrating a portion of the image sensing device, according to an embodiment of the present invention.

FIG. 2 is a circuit diagram illustrating a portion of the image sensing device 100 shown in FIG. 1.

According to the embodiment of FIG. 2, the image sensing device 100 may include a first pixel PX11, the ramp signal generation block 120, the noise compensation block 130, the first sampling block 141, and the first digital processing block 151.

The first pixel PX11 may generate the first pixel signal VPX<1> based on the first driving voltage VDDPX applied to the first pixel PX11. Since the first pixel PX11 is widely known to those skilled in the art, a detailed description thereon is omitted herein.

The ramp signal generation block 120 may include a ramp current generation unit 121 and a variable resistance unit 123. The ramp current generation unit 121 may be coupled between a supply terminal of a second driving voltage VDDRAMP and an output terminal of the ramp signal VRAMP. The variable resistance unit 123 may be coupled between the output terminal of the ramp signal VRAMP and a supply terminal of a ground voltage VSS. The ramp signal generation block 120 will be described in detail below (refer to FIG. 3).

The noise compensation block 130 may include a noise current generation unit 131 and a fixed resistance unit 133. The noise current generation unit 131 may be coupled between a supply terminal of the first driving voltage VDDPX and an output terminal of the noise signal VNC. The fixed resistance unit 133 may be coupled between the output terminal of the noise signal VNC and the supply terminal of the ground voltage VSS. The noise compensation block 130 will be described in detail below (refer to FIG. 4).

The first sampling block 141 may include a first sampling unit C1, a second sampling unit C2, and a third sampling unit C3. The first sampling unit C1 may sample the first pixel signal VPX<1> to generate a sampled first pixel signal SVPX<1>. The second sampling unit C2 may sample the ramp signal VRAMP to generate a sampled ramp signal SVRAMP. The third sampling unit C3 may sample the noise signal VNC to generate a sampled noise signal SVNC and may reflect the sampled noise signal SVNC in the sampled ramp signal SVRAMP. For example, each of the first to third sampling units C1, C2 and C3 may include a capacitor. In this case, it is desirable that a capacitance of the first sampling unit C1 is designed to be equal to the sum of a capacitance of the second sampling unit C2 and a capacitance of the third sampling unit C3.

The first digital processing block 151 may include a first comparison unit AMP1 and a first counting unit CNT1. The first comparison unit AMP1 may compare the sampled first pixel signal SVPX<1> with the sampled ramp signal SVRAMP to generate a first comparison signal C<1> corresponding to the comparison result. For example, the first comparison unit AMP1 may include a differential amplifier. The first counting unit CNT1 may count a count clock signal CLK_CNT based on the first comparison signal C<1> and may generate the first digital signal DOUT<1> corresponding to the count result. For example, the first counting unit CNT1 may include an up-down counter.

Figure 3:
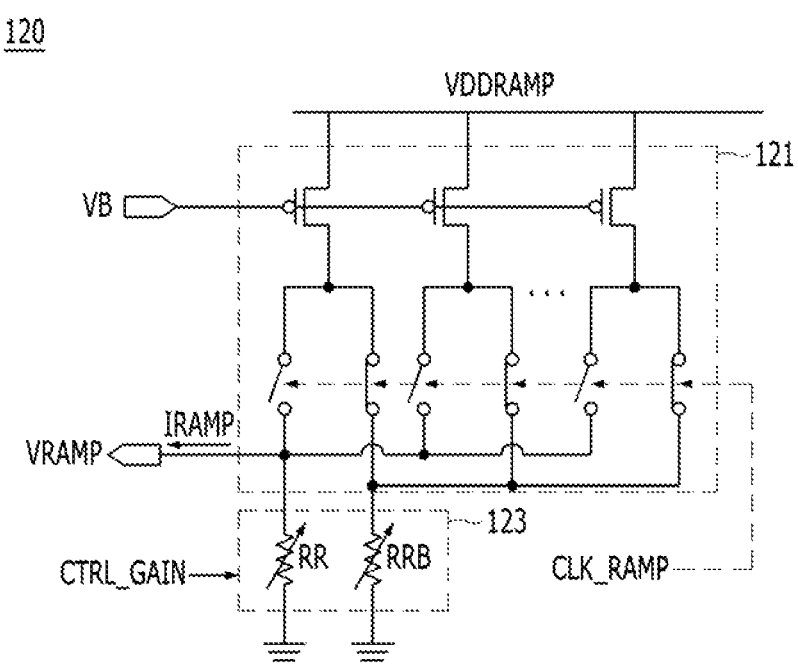
FIG. 3 is a circuit diagram illustrating a ramp signal generation block, according to an embodiment of the present invention.

According to the embodiment of FIG. 3, a ramp signal generation block 120 may include a ramp current generation unit 121 and a variable resistance unit 123.

The ramp current generation unit 121 may generate a ramp current IRAMP corresponding to the ramp signal VRAMP based on a ramp clock signal CLK_RAMP and a bias signal VB having a uniform voltage level. Since the ramp current generation unit 121 is widely known to those skilled in the art, a detailed description thereon is omitted herein.

The variable resistance unit 123 may have the resistance value varied based on the variable control signal CTRL_GAIN. For example, the variable resistance unit 123 may have the resistance value varied corresponding to the analog gain. The resistance value may be a parameter required for controlling a slope of the ramp signal VRAMP. For example, the variable resistance unit 123 may include a first variable resistance RR and a second variable resistance RRB. The first variable resistance RR may be coupled to the output terminal of the ramp signal VRAMP. The second variable resistance RRB may be coupled to an output terminal of a ramp bar signal that ramps in opposition to the ramp signal VRAMP. Since the ramp signal VRAMP is used in the embodiments of the present invention, a structure related to the ramp bar signal is not further mentioned herein.

Figure 4:
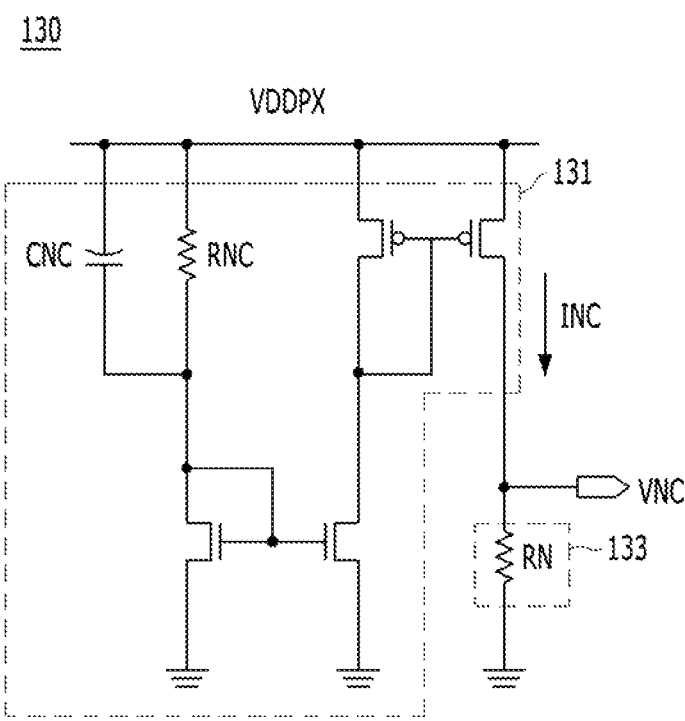
FIG. 4 is a circuit diagram illustrating a noise compensation block, according to an embodiment of the present invention.

According to the embodiment of FIG. 4, a noise compensation block 130 according to an embodiment of the present invention may include a noise current generation unit 131 and a fixed resistance unit 133.

The noise current generation unit 131 may sense the nose component from the first driving voltage VDDPX to generate a noise current INC corresponding to the noise component. Since the noise current generation unit 131 is widely known to those skilled in the art, a detailed description thereon is omitted herein.

The fixed resistance unit 133 may have a uniform resistance value. For example, the fixed resistance unit 133 may include a fixed resistance RN.

Hereinafter, an operation of the image sensing device 100 having the aforementioned structure is described.

For the sake of convenience in description, structures related to the first pixel PX11 are representatively described below.

Figure 5:
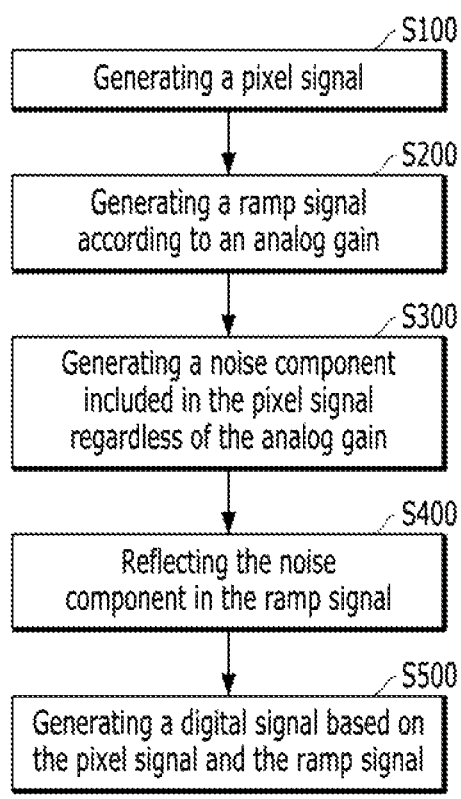
FIG. 5 is a flowchart illustrating a method for driving the image sensing device, according to an embodiment of the present invention.

According to the embodiment of FIG. 5, the first pixel PX11 may generate the first pixel signal VPX<1> during a first row time at the step S100. Since the first pixel PX11 generates the first pixel signal VPX<1> based on the first driving voltage VDDPX, the noise component included in the first driving voltage VDDPX may be reflected in the first pixel signal VPX<1>.

The ramp signal generation block 120 may generate the ramp signal VRAMP having a slope corresponding to an analog gain that is previously set during the first row time at the step S200. Particularly, the ramp signal generation block 120 may generate the ramp signal VRAMP based on the resistance value varied according to the analog gain. For example, the variable resistance unit 123 may be controlled to have the resistance value corresponding to the slope based on the variable control signal CTRL_GAIN corresponding to the analog gain. Under the conditions, when the ramp current generation unit 121 generates the ramp current IRAMP to the output terminal of the ramp signal VRAMP based on the ramp clock signal CLK_RAMP and the bias signal VB, the ramp signal VRAMP having the slope corresponding to the analog gain may be generated.

The noise compensation block 130 may sense the noise component included in the first driving voltage VDDPX to generate the noise signal VNC at the step S300. Particularly, the noise compensation block 130 may generate the noise signal VNC under the same condition regardless of the analog gain. For example, under the condition that the fixed resistance unit 133 has a uniform resistance value regardless of the analog gain, when the noise current generation unit 131 generates the noise current INC corresponding to the noise component to the output terminal of the noise signal VNC, the noise signal VNC regardless of the analog gain may be generated.

Subsequently, the first sampling block 141 may sample the first pixel signal VPX<1> to generate the sampled first pixel signal SVPX<1> and sample the ramp signal VRAMP to generate the sampled ramp signal SVRAMP and sample the noise signal VNC to generate the sampled noise signal SVNC. The first sampling block 141 may reflect the sampled noise signal SVNC in the sampled ramp signal SVRAMP at the step S400.

The first digital processing block 151 may generate the first digital signal DOUT<1> based on the sampled first pixel signal SVPX<1> and the sampled ramp signal SVRAMP at the step S500. For example, the first comparison unit AMP1 may compare the sampled first pixel signal SVPX<1> with the sampled ramp signal SVRAMP to generate the first comparison signal C<1>, and the first counting unit CNT1 may generate the first digital signal DOUT<1> based on the first comparison signal C<1> and the count clock signal CLK_CNT. Since the first comparison unit AMP1 may include a differential amplifier, the noise component reflected in the sampled first pixel signal SVPX<1> and the noise component reflected in the sampled ramp signal SVRAMP during a comparison operation of the first comparison unit AMP1 may be offset by each other.

In accordance with an embodiment the present invention, an image sensing device provided that is less sensitive to a device noise, e.g., thermal noise, as compared with a ramp signal generation circuit based on a variable current and may offset noise components included in a pixel signal by a noise compensation circuit. In addition, the image sensing device may have an optimal structure for independent operations of the ramp signal generation circuit and the noise compensation circuit.

In accordance with an embodiment of the present invention, a horizontal noise may be minimized as an image sensing device is insensitive to both of pixel power noise and device noise.

While the present invention has been described with respect to specific embodiments, the embodiments are not intended to be restrictive, but rather descriptive. Further, it is noted that the present invention may be achieved in various ways through substitution, change, and modification, by those skilled in the art without departing from the scope of the present invention as defined by the following claims.

What is claimed is:

1. An image sensing device, comprising:
a pixel suitable for generating a pixel signal based on a first driving voltage; a ramp signal generation block based on a variable resistance, the ramp signal generation block being suitable for generating a ramp signal whose slope is controlled by a resistance value varied according to an analog gain;
a noise compensation block based on a fixed resistance suitable for sensing a noise component included in the first driving voltage to generate a noise signal;
a first sampling unit coupled between an output terminal of the pixel signal and an output terminal of a sampled pixel signal and suitable for sampling the pixel signal and outputting the sampled pixel signal;
a second sampling unit coupled between an output terminal of the ramp signal and an output terminal of a sampled ramp signal and suitable for sampling the ramp signal and outputting the sampled ramp signal;
a third sampling unit coupled between an output terminal of the noise signal and the output terminal of the sampled ramp signal and suitable for sampling the noise signal and reflecting the sampled noise signal in the sampled ramp signal; and a digital processing block suitable for generating a digital signal based on the sampled pixel signal and the sampled ramp signal,
wherein the second sampling unit and the third sampling unit are coupled in parallel to the output terminal of the sampled ramp signal,
wherein each of the first to third sampling units includes a capacitor.

2. The image sensing device of claim 1, wherein a capacitance of the first sampling unit is equal to the sum of a capacitance of the second sampling unit and a capacitance of the third sampling unit.

3. The image sensing device of claim 1, wherein the ramp signal generation block includes:
a ramp current generation unit coupled between a supply terminal of a second driving voltage and an output terminal of the ramp signal and suitable for generating a ramp current based on a clock signal and a bias signal having a uniform voltage level; and
a variable resistance unit coupled between the output terminal of the ramp signal and a supply terminal of a ground voltage and having the resistance value varied based on a variable control signal corresponding to the analog gain.

4. The image sensing device of claim 1, wherein the noise compensation block includes:
a noise current generation unit coupled between a supply terminal of the first driving voltage and an output terminal of the noise signal and suitable for sensing the noise component from the first driving voltage and generating a noise current corresponding to the noise component; and
a fixed resistance unit coupled between the output terminal of the noise signal and the supply terminal of the ground voltage and having a uniform resistance value.

5. An image sensing device, comprising:
a pixel suitable for generating a pixel signal based on a first driving voltage;
a ramp signal generation block suitable for generating a ramp signal whose slope is controlled based on an analog gain;
a noise compensation block suitable for sensing a noise component included in the first driving voltage to generate a noise signal;
a first sampling unit coupled between an output terminal of the pixel signal and an output terminal of a sampled pixel signal and suitable for sampling the pixel signal and outputting the sampled pixel signal;
a second sampling unit coupled between an output terminal of the ramp signal and an output terminal of a sampled ramp signal and suitable for sampling the ramp signal and outputting the sampled ramp signal;
a third sampling unit coupled between an output terminal of the noise signal and the output terminal of the sampled ramp signal and suitable for sampling the noise signal and reflecting the sampled noise signal in the sampled ramp signal; and
a digital processing block suitable for generating a digital signal based on the sampled pixel signal and the sampled ramp signal,
wherein the second sampling unit and the third sampling unit are coupled in parallel to the output terminal of the sampled ramp signal,
wherein each of the first to third sampling units includes a capacitor.

6. The image sensing device of claim 5, wherein a capacitance of the first sampling unit is equal to the sum of a capacitance of the second sampling unit and a capacitance of the third sampling unit.

7. The image sensing device of claim 5, wherein the ramp signal generation block is designed based on a variable resistance.

8. The image sensing device of claim 7, wherein the ramp signal generation block includes:
  a ramp current generation unit coupled between a supply terminal of a second driving voltage and an output terminal of the ramp signal and suitable for generating a ramp current based on a clock signal and a bias signal having a uniform voltage level; and
  a variable resistance unit coupled between the output terminal of the ramp signal and a supply terminal of a ground voltage and having a resistance value varied based on a variable control signal corresponding to the analog gain.

9. The image sensing device of claim 5, wherein the noise compensation block is designed based on a fixed resistance.

10. The image sensing device of claim 9, wherein the noise compensation block includes:
  a noise current generation unit coupled between a supply terminal of the first driving voltage and an output terminal of the noise signal and suitable for sensing the noise component from the first driving voltage and generating a noise current corresponding to the noise component; and
  a fixed resistance unit coupled between the output terminal of the noise signal and the supply terminal of the ground voltage and having a uniform resistance value.

* * * * *